United States Patent [19]

Rendall et al.

[11] Patent Number: 5,124,008

[45] Date of Patent: Jun. 23, 1992

[54] METHOD OF EXTRACTION OF VALUABLE MINERALS AND PRECIOUS METALS FROM OIL SANDS ORE BODIES AND OTHER RELATED ORE BODIES

[75] Inventors: John S. Rendall; Valentine W. Vaughn, Jr., both of Albuquerque, N. Mex.

[73] Assignee: Solv-Ex Corporation, Albuquerque, N. Mex.

[21] Appl. No.: 542,723

[22] Filed: Jun. 22, 1990

[51] Int. Cl.$^5$ .......................... C25C 3/28; C25C 3/06; C22B 1/24; C01B 17/50

[52] U.S. Cl. ..................................... 204/61; 204/64 T; 204/67; 75/365; 75/430; 75/435; 75/958; 423/522; 423/541 R; 423/567 R

[58] Field of Search ................. 75/712, 744, 365, 430, 75/435, 958; 423/29, 150, 522, 541 R, 567 R; 204/67

[56] References Cited

U.S. PATENT DOCUMENTS

| | | | |
|---|---|---|---|
| 3,047,477 | 7/1962 | Spraul et al. | 204/64 T X |
| 4,212,855 | 7/1980 | Kerner et al. | 423/522 |
| 4,457,812 | 7/1984 | Rado | 204/67 X |
| 4,465,659 | 8/1984 | Cambridge et al. | 204/67 X |
| 4,495,054 | 1/1985 | Claflin | 75/958 X |
| 4,547,272 | 10/1985 | Josefowicz | 204/64 T X |
| 4,551,172 | 11/1985 | Formanek et al. | 75/958 X |
| 4,816,236 | 3/1989 | Gardner | 75/430 X |

FOREIGN PATENT DOCUMENTS 0120682  7/1982  Japan ..................................... 204/67

Primary Examiner—Donald R. Valentine
Attorney, Agent, or Firm—Thomas E. Schatzel

[57] ABSTRACT

A method for the extraction of valuable minerals and precious metals from oil sands ore bodies or other related ore bodies that is synergistically unique in the arrangement of processes for production of valuable minerals and precious metals in an economically and environmentally acceptable manner. The oil sands ores from oil sands ore bodies and other related ores from other related ore bodies including overburden and interburden mineral ores are crushed, the hydrocarbons, if any exists in worthwhile quantities, are recovered and the resulting coarse sands, other related ores and fines streams are processed in a definite sequence using known processes to recover the valuable minerals and precious metals values. All reactants and reagents, including water, are recycled in the method and tailings ponds are not required. Heat recovery is used extensively to cogenerate almost all of the process steam and process electrical requirements for the method. The spent damp coarse sands and spent damp fines are stockpiled and/or returned to the mine.

27 Claims, 1 Drawing Sheet

METHOD OF EXTRACTION OF VALUABLE MINERALS AND PRECIOUS METALS FROM OIL SANDS ORE BODIES AND OTHER RELATED ORE BODIES

BACKGROUND OF THE INVENTION

1. Field of the Invention

This invention relates to a method that is synergistically unique for extracting valuable minerals and precious metals from ore bodies, such as oil sands ore bodies and other related ore bodies, and which is environmentally acceptable and economical.

2. Description of the Prior Art

Oil sand ore bodies, also frequently referred to as tar sands ore bodies, commonly include valuable minerals and precious metals, e.g. oil, alumina, titanium, gold, silver, platinum, etc. The oil sands ore bodies commonly include overburden material near the surface overlaying oil sands ore which have interburden clay/fines lenses interspersed throughout the oils sands ore. All of these materials have been found to contain various quantities of valuable minerals and precious metals. The overburden material and the interburden clay/fines lenses must be mined to access the oil sands ore for oil extraction. The overburden material and the interburden clay/fines lenses are hereinafter called mineral ores. Oil extraction from the oil sands ore is required for valuable minerals and precious metals recovery from the clean oil sands ore tailings.

Other related ore bodies containing clay/fines lenses frequently have similar mineralization of aluminum values with iron and titanium and possibly precious metal values. These other related ore bodies, though similar in geological and mineralogical character to oil sands ore bodies, contain little, if any, of the hydrocarbons of conventional oil, heavy oil, kerogen or bitumen.

Oil sands ore bodies and other related ore bodies are extensive worldwide and found on all major continents. Estimated potential daily oil production from oil sands ore bodies is millions of barrels of synthetic crude oil and large quantities of valuable minerals and precious metals. One of the world's major oil sands ore bodies is in Athabasca, Northern Alberta, Canada. Currently, production from these ore bodies is over 200,000 barrels per day of synthetic crude oil. The known reserves are capable of sustaining a production several times that amount throughout the twenty-first century.

Solid waste tailings generated from the recovery of oil from such oil sands ore bodies would be millions of tons per year. Approximately two tons of solid waste tailings from oil sands extraction processes are produced per barrel of synthetic crude oil. The solid waste tailings from the Canadian production of synthetic crude oil are known to contain a significant amount of valuable minerals and also additional amounts of precious metals. Past efforts to recover these valuable minerals and precious metals were directed to processing the waste tailings from the existing production of oil by a hot water process or modifications thereof. These efforts have produced limited results and have not eliminated the environmental problem of large tailings ponds. There are several methods of recovering minerals from the waste tailings produced by the hot water process as disclosed in U.S. Pat. No. 4,225,422, by Lloyd, et al; U.S. Pat. No. 4,138,467, by Kamisky, et al; and by U.S. Pat. No. 3,990,885, by Baillie, et al. The economics of these efforts have floundered because of the emulsified nature of the waste tailings which include oil, clay, solvent, water and caustic discharged as waste into the tailings ponds. Another oil extraction process as disclosed in U.S. Pat. No. 4,875,998, by Rendall and/or other known processes will provide the necessary feed stock to which this method applies.

Oil sands ore bodies and other related ore bodies as referred to herein commonly contain clays having alumina, iron and/or titanium values. U.S. Pat. No. 3,143,392, to Saeman; U.S. Pat. No. 2,951,743, to Kretzschmar; and U.S. Pat. No. 2,958,580, to Loevenstein have addressed the issue of alumina and iron extraction while discharging the titanium minerals as waste. These processes have significant drawbacks such as solid/liquid separation problems, iron impurities in the products, waste streams causing effluent disposal problems, and high energy costs. The titanium values from oil sands ore bodies and other related ore bodies may be produced through various methods, such as chlorinating processes as stated in U.S. Pat. No. 4,119,697, by Tolley; U.S. Pat. No. 3,977,863, by Glaeser; U.S. Pat. No. 3,903,239, by Berkovich; U.S. Pat. No. 3,859,077, by Othmar; and U.S. Pat. No. 3,549,322, by Klein.

The chlorinating process has advantages, such as ease of separating iron and titanium. However, it also has drawbacks, one of which is the requirement of large particle size for processing. This makes such process unattractive for the sequence of processing encountered by the present method, because it would only be suitable for partial minerals recovery. Further, heretofore, the mineral ores in oil sands ore bodies and other related ore bodies have not been utilized for economical removal of known mineral values and/or precious metal values.

A requirement exists for an extraction sequence which processes ores from these ore bodies and extracts minerals and/or precious metals economically and in an environmentally acceptable manner. For example, removal of minerals by agglomerating (pugmilling) with sulphuric acid is presently practiced on a large scale by the copper industry, as is the removal of titanium from sulphuric acid leach liquors containing large amounts of iron. Oil sands ore bodies and other related ore bodies frequently contain humic acids which resulted from the humus materials contained in the ore bodies. The chemical interaction of the humic acids with the elemental molecular matrix of the valuable minerals over long periods of geological time has enabled the agglomeration of these valuable minerals into leachable sulphates. Leaching out precious metals using various leachants such as, but not limited to, sodium cyanide is also routinely practiced on suitable ore bodies. The use of the sulphuric acid process is advantageous because $SO_2$ can be readily recycled and the minerals are produced by proven technologies providing high yields with acceptable product quality for the market. The purification stages of alumina, titanium and iron produce $SO_2$ which is recovered, converted into sulphuric acid and recycled as part of the overall process arrangement.

SUMMARY OF THE PRESENT INVENTION

An object of the present invention is to provide a method for extracting from oil sands ore bodies, or other related ore bodies, a high yield of valuable minerals, e.g. alumina, iron, titanium and various compounds thereof, and precious metals such as gold, silver and/or platinum.

Another object of the present invention is to provide an economical and environmentally viable method of extracting such valuable minerals and precious metals.

Another object of the present invention is to provide such a method including recycling of extractants and reagents used in the extraction and production processes, for example, the $SO_2$ gases.

Another object of the present invention is to provide a process for extracting valuable minerals and precious metals in a synergistically unique arrangement which utilizes techniques of cogeneration for process electricity, process steam, and other heating and cooling process requirements.

Briefly, a preferred embodiment of the present invention includes crushing the mined ore after removing oversized material, such as rock and waste. These removed materials, hereinafter called rejects, may be stockpiled or directly returned to the mine site as backfill.

If the crushed ore contains adequate quantities of hydrocarbons, the hydrocarbons are extracted and then upgraded to synthetic crude oil. Mined ore from other related ore bodies and mineral ores from oil sands ore bodies and/or other related ore bodies, containing little or no hydrocarbons, but containing economic quantities of valuable minerals and/or precious metals are crushed and ground.

The crushing of the mined oil sands ore and extraction of the hydrocarbons normally results in two tailings fractions, i.e. a coarse sands fraction exceeding approximately 325 mesh, and a fines fraction of less than approximately 325 mesh size. In some hydrocarbon extraction processes, only one apparent tailing stream is produced. However, this stream can then be separated by conventional means into coarse sands and fines.

Coarse sands from the hydrocarbons extraction step are slurried with water and passed through conventional precious metals flotation equipment. The hydrocarbons and water stream from the flotation equipment, is recycled to the hydrocarbon extraction means and the precious metals stream from the flotation equipment is removed for further treatment in the precious metals production means. The remaining coarse sands slurry is then processed for separation of heavy minerals, if any, from the coarse sands. The recovered heavy minerals are agglomerated, cured and leached. The spent coarse sands slurry residual is dewatered and ready for backfill of the mine or for storage for future backfill. Some of the spent coarse sands may be classified for concrete aggregate or dried for glass production sand. All process water may be recycled.

The wet fines from the hydrocarbon extraction means, if applicable, enter the fines drying means and any residual hydrocarbons and water are removed, resulting in dry fines. The removed hydrocarbons and water are recycled to the hydrocarbon extraction means. Mineral ores and ores from other related ore bodies, after being crushed and ground in the crushing and grinding means, may need to be dried before processing in the agglomerating section of the agglomerating, curing and leaching means.

In the agglomerating section, the fines, heavy minerals, ground mineral ores streams and possibly ashes from any coal burning processes, are agglomerated with concentrated sulphuric acid to convert the valuable minerals to sulphates. The resultant sulphuric acid agglomerated materials, hereinafter called agglomerated material, are then transported to large vats for curing and leaching. The vats include curing and drying facilities with vents to recover the reaction gases. Once the batch curing step is completed following the exothermic reactions and any necessary drying, the cured agglomerated material is ready for batch leaching. Batch leaching produces a sulphuric acid leach liquor containing the aluminum, iron, titanium, etc., mineral values. Water is used as the leaching agent. The resulting sulphuric acid leach liquor is recycled until it becomes highly saturated with the mineral values, e.g. aluminum, iron, titanium, etc. Then it is processed through several stages of washing with fresh water. The fresh water washes recover almost all of the remaining mineral values and are combined with the almost saturated sulphuric acid leach liquor, containing the mineral values. The sulphuric acid leach liquor containing the mineral values becomes the mother liquor which is then processed for removal of the valuable minerals while the raffinate liquor is recycled.

The spent agglomerated material in the vats, minus the valuable minerals, is neutralized with lime and leached with aerated sodium cyanide and water to remove the precious metals values. The resultant precious metals leach mother liquor can be recycled. The precious metals leach mother liquor is treated conventionally to produce precious metals such as gold and/or silver while the raffinate liquor is recycled. For platinum, a further step of leaching using a suitable agent such as aqua regia can be added in which case the sodium cyanide leach step might be eliminated. Finally, a neutralizing liquor is circulated through the spent material in the vats before such material is removed from the vats for transportation to backfill storage or directly to the mine.

If a high iron concentration exists in the sulphuric acid leach mother liquor, the iron sulphate may be precipitated first as crystals by cooling and evaporation of water from the mother liquor. These crystals are then washed, dried and roasted for recovery and recycling of the sulphur values. The raffinate leach liquor containing the remaining mineral values is then heated and concentrated by evaporation and aluminum sulphate crystals, of required minimal size, are continuously precipitated. These aluminum sulphate crystals are then centrifuged and washed with cold water. The aluminum sulphate crystals must be of the purity necessary to be dried and calcined for cell grade alumina production. This alumina is for aluminum production by the conventional Hall process. To insure that the necessary purity is achieved, an additional step of recrystallization, centrifuging and washing may be used. Alternatively, an aluminum chloride method may be used to produce the metal aluminum in electrolytic cells while the chlorine is recycled.

The raffinate leach liquor containing the mineral values, after partial aluminum sulphate removal, is further concentrated by cooling and evaporation for the continuous removal of iron in the form of ferric sulphate crystals with some ferrous sulphate present. The iron sulphate crystals are then centrifuged, washed, dried, calcined and reduced to produce iron powder. The crystal size is produced at the required size for use in the iron powder market. Alternatively, the powder can be briquetted or pelletized for transport of direct reduced iron to the marketplace. As another alternative, the reduction step may produce direct reduced iron pellets, or rolled into plates depending on market requirements.

The raffinate leach liquor containing the mineral values minus a major fraction of the aluminum and iron is heated and concentrated to further remove aluminum sulphate as previously described. The raffinate leach liquor, containing the residue mineral values is now recycled to the vats for the sulphuric acid leaching step.

A portion of the raffinate leach liquor, containing the remaining mineral values, minus the majority of the aluminum and most of the iron, is then processed for titanyl sulphate removal. The portion of the raffinate leach liquor containing the remaining mineral values is drawn off when the iron sulphate and the titanium dioxide values are approximately in balance with the rate at which titanium enters the system from the leaching step. The titanyl sulphate is precipitated by hydrolysis using steam and seeding. The fine titanyl sulphate precipitate is filtered, washed, dried and calcined to produce titanium dioxide pigment in a series of steps. Alternatively, the initial fine calcined titanyl sulphate precipitate can be calcined and then ground into a fine powder, mixed with powdered carbon and chlorinated in a pipe reactor rather than in a conventional fluid bed. A known residence time with a stoichiometric quantity of chlorine at known chlorination temperatures produces titanium tetrachloride vapors which are cooled in a fractionation column. The titanium tetrachloride can then be oxidized with the chlorine recycled, or it can be converted to titanium sponge metal in electrolytic cells while chlorine is recycled. The final spent leach liquor containing a small quantity of the remaining mineral values is then recycled and a bleed stream is used to remove metal impurities which are recovered separately.

The high temperature off-gases from the alumina, iron and titanium plants are used to cogenerate process steam and electricity for the facility. The sulphur containing gases are processed to remove $SO_2$ to satisfy required current emissions standards. The production of sulphuric acid for recycle from the recovery of the $SO_2$ gases and acid water streams completes the waste recovery cycle with additional cogeneration production of process steam and electricity. Of note, is that the entire steam and electric needs of the complex may be met in this fashion.

An advantage of the method of the present invention is that it is applicable to large quantities of residues, clean sand and clay/fines tailings, after oil extraction from oil sands ore bodies.

Another advantage of the present invention is that mineral ores related to oil sands ore bodies and other related ore bodies can be processed by the method of this invention for the extraction of valuable minerals and precious metals values.

Another advantage of the present invention is that the water and leaching agents may be recycled thereby leading to environmentally clean and acceptable residues for backfilling.

Another advantage of the present invention is that high yields of aluminum are obtained.

Another advantage of the present invention is that alumina purity for the necessary market can be obtained or aluminum metal may be produced.

Another advantage of the present invention is that the iron impurities can be economically removed for further marketing.

Another advantage of the present invention is that additional mineral values may be extracted from coal ash when coal burning is used in any part of the processing.

Another advantage of the present invention is that high yields of precious metals values are obtained.

Another advantage of the present invention is that valuable minerals, such as alumina, iron and titanium, in leach liquor can be extracted and the leaching liquor agents recycled.

Another advantage of the present invention is that a precious metals leach liquor is produced in combination with the valuable minerals processes and that these precious metals can be economically and environmentally produced with the precious metals leaching liquor agents recycled within the combined processes.

Another advantage of the present invention is that almost all the sulphur values are recycled.

Another advantage of the present invention is that the extractants and reagents used in the extraction and production processes may be recycled to protect the environment.

Another advantage of the present invention is that the waste heat may be utilized to produce the process steam and electric power needs of the process to increase the economy of the method.

Another advantage of the present invention is that the final inert waste contains only small amounts of water and can be stockpiled or directly backfilled into the mine.

Another advantage of the present invention is that part of the spent damp coarse sands can be classified for concrete aggregate or dried for glass production sand, thus adding additional value.

Another advantage of the present invention is that tailings ponds are not required.

These and other objects and advantages of the present invention will no doubt become obvious to those of ordinary skill in the art after having read the following detailed description of the preferred embodiment which is illustrated in the various drawing figures.

IN THE DRAWING

FIG. 1 is an overall block diagram of the method for extracting valuable minerals and/or precious metals and hydrocarbons from oil sands ore bodies or only the valuable minerals and/or precious metals from other related ore bodies containing little or no hydrocarbons, in accordance with the present invention.

DETAILED DESCRIPTION OF THE PREFERRED EMBODIMENT

Figure 1:
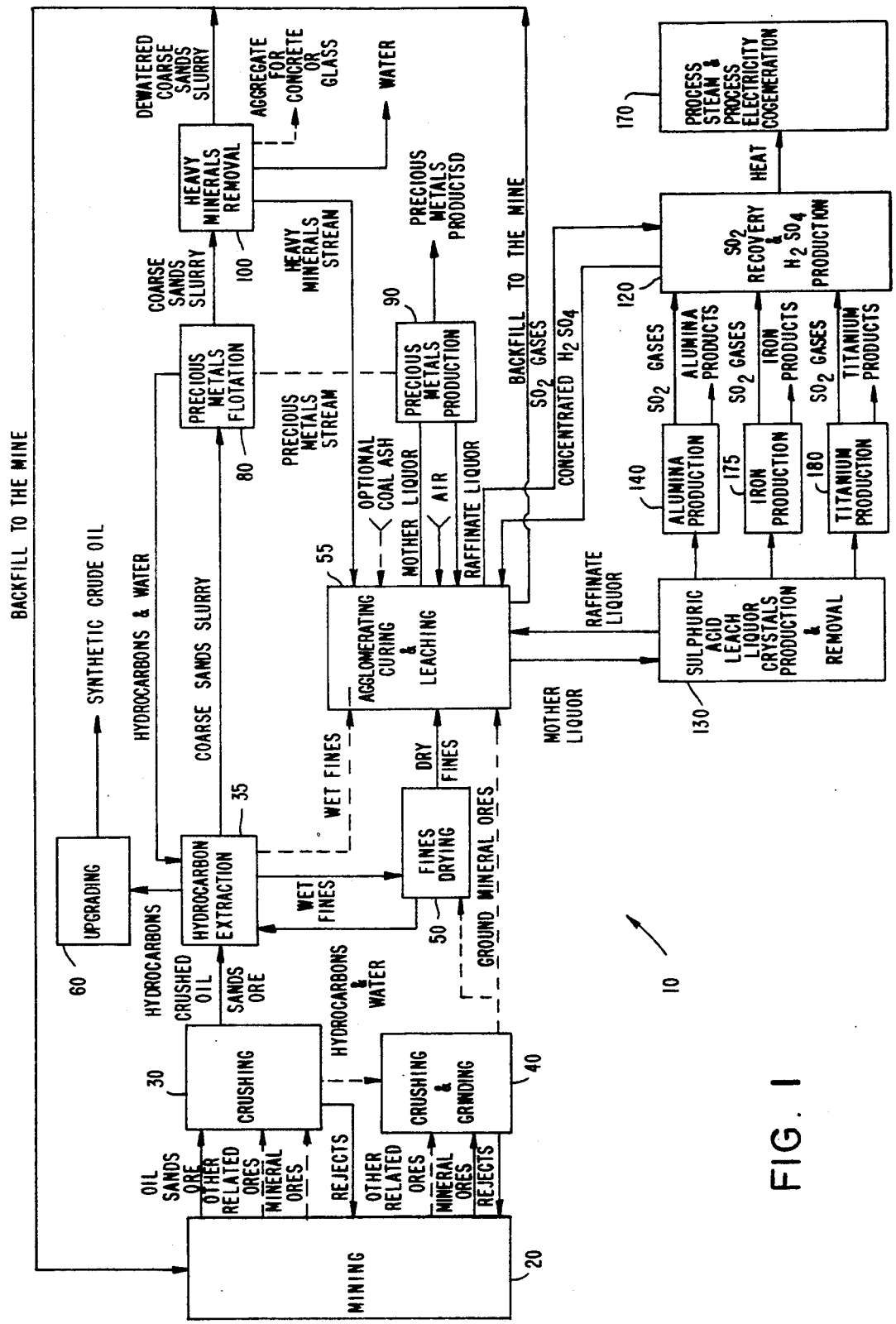

FIG. 1 is a block diagram illustrating the overall process of the method of the present invention, and referred to by the general reference character 10. The process begins with a mining means 20 which includes a mine plan for an ore body. The selective mining of this ore body is carried out by mining equipment such as shovels, front-end loaders, bucket wheels, drag lines or preferably continuous miners. Selective mining is used in the mining means 20 to insure that the oil sands ore, other related ores and mineral ores, are mined with adequate precision to preclude unnecessary commingling of these ores which would result in additional costs. The ore body may have to be loosened by drilling and blasting before removal of the mined ores. Oil sands ore with a cut-off grade greater than two to six weight percent of hydrocarbons leaves the mining means 20 by dump trucks and/or conveyors and enters a crushing means 30.

In the crushing means 30, the rejects are removed. Then, conventional crushing equipment such as delumpers, crushers and other size reduction equipment reduces the oil sands ore containing more than two to six weight percent of hydrocarbons to approximately −6 inches. The −6 inch crushed oil sands leaves the crushing means 30 by dump trucks and/or conveyors and enters a hydrocarbon extraction means 35.

Alternatively, for the other related ores and mineral ores which have less than two to six weight percent of hydrocarbons, or no hydrocarbons, the selective mining operation could be basically the same as previously discussed with the related ores and mineral ores leaving the mining means 20 by trucks and/or conveyors and entering a crushing and grinding means 40.

In the crushing and grinding means 40 after removal of the rejects, the other related ores and mineral ores are reduced in size by using conventional crushing and grinding size reduction equipment such as delumpers, crushers, rollers, cones, gyratory and impact equipment to get a maximum particle size of about ¼". The main size criteria is the largest size of particle which will allow satisfactory agglomeration separately or when mixed with the dried fines from a fines drying means 50. The crushed and ground other related ores and mineral ores which leave the crushing and grinding means 40 are also pumped or conveyed to either the fines drying means 50 or directly to an agglomerating section of an agglomerating, curing and leaching means 55, depending on the mineralogical character of the ores fed into the crushing and grinding means 40. In some cases, for certain ores, the crushing means 30 and the crushing and grinding means 40 may be combined.

In the hydrocarbon extraction means 35, substantially all the hydrocarbons are removed. This may be done by various means, for example, using solvent assisted hot water extraction, solvent extraction, hot water extraction, cold water extraction, or other thermal methods for extraction and recovery of the hydrocarbons from the oil sands ore. The waste residue tailings from means 35 may be in two streams, i.e. a coarse sands fraction with particle size greater than approximately 325 mesh, and a fines fraction less than approximately 325 mesh. Should means 35 be a process with a single waste stream, the single waste stream may then be separated into coarse sands and fines fractions. The extracted and recovered hydrocarbons leave the hydrocarbon extraction means 35 and are transported to the upgrading means 60. In the upgrading means 60, the hydrocarbons are converted, by any number of conventional hydrogen addition or coking processes, to synthetic crude oil. The crude oil leaves the upgrading means 60 as product synthetic crude oil available for transport to market areas.

The wet fines produced in the hydrocarbon extraction means 35 are moved by pumping or conveyors, to the fines drying means 50 which uses conventional drying equipment to remove any existing water and remaining hydrocarbons which are then recycled to the hydrocarbon extraction means 35. Alternatively, the wet fines produced in the hydrocarbon extraction means 35 may report directly to the agglomerating, curing and leaching means 55 depending on the characteristics and mineralogical matrix of the ground mineral ores. The coarse sands produced in the hydrocarbons extraction means 35 is then slurried with water, if needed. The slurried coarse sands enter a precious metals flotation means 80 by pumping or conveyors where the coarse sands slurry is passed through precious metals flotation equipment using flotation agents such as methyl isobutyl ketone (MIBK) to float the precious metals and hydrocarbons layers, if any, which are removed by pumping or conveyors from the flotation tanks for further conventional treatment to separate the hydrocarbons and water stream, if any, from the precious metals stream. The hydrocarbons and water stream, if any, leaves means 80 by pumping and is recycled to the hydrocarbon extraction means 35 where the hydrocarbons are recovered in the process. The precious metals stream leaves means 80 by pumping or conveyors and enters a precious metals production means 90. The coarse sands slurry less the precious metals and hydrocarbons leaves means 80 by pumping or conveyors and enters a heavy minerals removal means 100.

In the heavy minerals removal means 100, the coarse sands slurry is passed through conventional gravity separators for separation of heavy minerals from the coarse sands slurry. This step may involve multiple stages to increase efficiency and yields. The recovered heavy minerals stream is then conveyed to the agglomerating section of the agglomerating, curing and leaching means 55. The spent coarse sands slurry residual in means 100 is dewatered and leaves by pumping or conveying equipment and may be stockpiled or returned to the mining means 20 for backfill. Alternatively, a portion of the damp coarse sands can be classified for concrete aggregate or dried for glass sand production. The heavy minerals removal means 100 is only used when heavy minerals exist in valuable quantities in the ore body being mined. All the process water is recycled throughout the process 10.

The fines drying means 50 receives wet fines from the hydrocarbons extraction means 35, if the processed oil sands ore contains worthwhile quantities of hydrocarbons of greater than two to six weight percent. Ground ores from other related ore bodies and mineral ores from the crushing and grinding means 40 may or may not report to the fines drying means 50. This depends on the mineralogical nature of the ores used in means 40 and the ability of the material to agglomerate in means 55. Conventional equipment presently used in both the mineral and food processing industries will satisfy the equipment requirements of fine drying means 50. Whatever fines are dried in means 50, including ground ores from other related ore bodies, mineral ores are conveyed to the agglomerating, curing and leaching means 55.

In the agglomerating section of means 55, the received ground ores from other related ore bodies, mineral ores, the fines from drying means 50, and the heavy metals stream, if any, from means 100, are transported by pumping or conveying into means 55 for processing. Also, coal ash, if suitable from coal burning processes or any combination, arrangement or deletion thereof of the above due to the mineralogical nature of the ores processed and the processes used, may be agglomerated in the agglomerating section of means 55. The agglomeration section of means 55, includes agglomeration equipment such as pugmills for combining the fines, ground ores from other related ore bodies, mineral ores and the heavy mineral stream. These streams are combined with concentrated sulphuric acid ($H_2SO_4$) from an $SO_2$ recovery and $H_2SO_4$ production means 120 which receives SO₂ from a valuable minerals production means 140, 175 and 180. The streams in section 55 may be agglomerated individually or in combination. The decision to agglomerate these streams individually or as combinations of streams, primarily depends on the ability of the agglomeration process within section 55 to produce agglomerates of similar size and mineral matrix for high yield leaching. In the agglomerating process within section 55, concentrated sulphuric acid is added such that the liquid weight is approximately equivalent to fifty weight percent of the solid weight of the fines and the excess sulphuric acid is in the order of five to forty weight percent of the stoichiometric amount needed to convert the minerals to sulphates. The resultant agglomerated material, hereinafter called agglomerated material, is then transported by conveying equipment to large vats for the curing and leaching steps within section 55.

These vats within section 55 are large, deep, and preferably rectangular shaped. The vats are fitted with steam and hot air curing facilities and drying facilities, if required, with vents to recover the gases of reaction which are recycled within the process arrangement. The curing is accomplished by raising the temperature of the agglomerated material in the vats to about 70°–100° C. using steam. An exothermic reaction takes the temperature up to around 170°–200° C. with the evolution of reaction gases followed by hot air drying, if required, to further bond the agglomerated material. If needed, a bonding agent may also be added. The reaction gases which are removed by the vent system are recycled to the SO₂ recovery and H₂SO₄ production means 120 wherein, the gases are scrubbed and then sent to the sulphur recovery system section. The curing and drying steps within means 55 may take up to twenty-four hours depending on the mineralogy and matrix quality of the agglomerated material. The leaching step in means 55 follows the curing and drying steps. The cured agglomerate material in the vats' section of means 55 is then leached, preferably downward with water pumped to the vats' section of means 55 from means 130. The water is recycled between the vats in means 55 and means 130 for up to twenty-four hours to produce the sulphuric acid leach liquor which now contains the aluminum, iron, titanium, etc. minerals. This leaching step is then followed by stages of washing with fresh water (minimum of one or two stages). The wash liquor is combined with the sulphuric acid leach liquor to increase the yield of leached valuable minerals and is the valuable minerals leach mother liquor.

The sulphuric acid leach mother liquor, containing the aluminum, iron, titanium, etc., mineral values is contained in the sulphuric acid leach liquor crystal production and removal means 130 is now ready for the removal of the aluminum, iron, titanium, etc. values.

First, when the temperature of the sulphuric acid leach mother liquor is about 80° C., the concentration of iron sulphate is generally above 1% of the sulphuric acid leach mother liquor. The sulphuric acid leach mother liquor is then cooled to about 20° C. and evaporated to precipitate the iron sulphate crystals which are then centrifuged and washed. These iron sulphate crystals are combined with the iron sulphate crystals from a subsequent step, dried and roasted for recovery and recycle of the sulphur values.

Second, the sulphuric acid raffinate leach liquor, now at a temperature of around 20° C., if Step 1 was used, is concentrated by heating and evaporation at around 80° C. Otherwise, Step 1 is accomplished at approximately 80° C. The aluminum sulphate crystals are then continuously precipitated at the required crystal size using conventional draft or other type crystallizers. These crystals are centrifuged and washed with cold water equivalent to approximately thirty weight percent of the crystals. The crystals must be of the necessary purity for cell grade alumina production with particular emphasis on low iron in the finished product, 0–0.02 weight percent or less. These aluminum sulphate crystals leave means 130 and enter an alumina production means 140. In means 140, the aluminum sulphate crystals are recrystallized and washed to eliminate any iron impurity or other impurities that exceed the specifications for cell grade alumina. The pure crystals of aluminum sulphate are then dried and calcined in fluid beds using coal, oil or gas fired furnaces for the production of cell grade alumina product. The alumina products leaving the alumina production means 140 may then be used in the marketplace. Alternatively, an aluminum chloride method may be used to produce the metal aluminum in electrolytic cells while the chlorine is recycled. The sulphur dioxide exhaust gases are sent to the means 120 for heat removal used in cogeneration means 170 to produce process steam and electric power. The sulphuric acid produced in means 120 is recycled to the agglomerating, curing and leaching means 55.

Third, the remaining sulphuric acid raffinate leach liquor in means 130, after the initial aluminum sulphate removal, is further concentrated by cooling and evaporation at about 20° C. for continuous removal of the iron in the form of ferric sulphate crystals with some ferrous sulphate present using standard conventional crystallizers. The iron sulphate crystals are centrifuged and washed. These iron sulphate crystals are conveyed from means 130 to the iron production means 175 where the iron sulphate crystals are dried and calcined to produce iron oxide crystals. If necessary, the iron oxide crystals are reduced using conventional fluid bed or other types of equipment to produce iron powder briquettes or pellets. The crystal size is predetermined and produced in the crystallizer step at the required size when produced for use in the iron powder market using equipment commercially in use for the purpose of safely transporting the direct reduced iron to the marketplace. Alternatively, as products, the powder can be briquetted or pelletized or rolled into plate. An alternative reduction step may use conventional available processes such as the Midrex Process or the Corex Process or fluid beds using coal, oil or gas fired furnaces with reducing gases to produce direct reduced iron. The iron product leaving means 175 may be used in the marketplace. The sulphur dioxide gases from the calciners of means 175 are treated and sent to means 120 for removal of heat in turn used in the cogeneration means 170, and production of sulphuric acid produced in means 120 which in turn is recycled to the agglomerating, curing and leaching means 55.

Fourth, the remaining raffinate leach liquor in means 130, less a major fraction of the aluminum and iron, is then heated and concentrated at about 80° C. to further remove aluminum sulphate using crystallizers and centrifuges with washing as described before. This material is added to the initial aluminum sulphate for the optional recrystallization step followed by drying and calcination (preferably by using fluid bed techniques) at temperatures around 1000° C. for removal of the sulphur. The final raffinate leach liquor is then recycled until the processing produces a recycle raffinate leach liquor of about equal proportions of iron sulphate and titanium dioxide. A bleed stream from this recycle liquor is taken off at the rate at which titanium is introduced into the liquor in the leaching step. This bleed stream is concentrated to about 200-300 grams/liter of titanium dioxide. The titanyl sulphate is precipitated by hydrolysis using steam and seeding (rutile or anatse). The fine precipitate is washed and filtered using rotary vacuum filters or other types of filters, then dried, calcined and transported to titanium production means 180.

In titanium production means 180, the calcined titanium dioxide precipitate may be converted to titanium dioxide pigment product using conventional methods now practiced in the titanium dioxide pigment industry. Alternatively, the initial calcined precipitate may be ground into a fine $-325$ mesh powder and mixed with powdered carbon in a stoichiometric quantity capable of producing CO to $CO_2$ in a ratio of approximately two to one and then chlorinated in a pipe reactor rather than in a conventional rutile fluid bed as commercially practiced. A residence time of less than two minutes, while reacting with a stoichiometric quantity of chlorine at known chlorination temperatures in the range of 900° to 1000° C., produces a titanium tetrachloride vapor which is cooled in a fractionation column with only a very minor iron chloride waste stream. High boiling point impurities will be removed from the bottom of the fractionation column and low boiling point impurities will be removed from the top of the column. The vapors are fractionally distilled to produce titanium tetrachloride which is then put into electrolytic cells to produce titanium sponge metal while recycling the chlorine. The titanium tetrachloride can also be oxidized to produce titanium dioxide pigment with the chlorine recycled. The titanium products leave the titanium products production means 180 for the marketplace on railway cars or trucks.

The washed agglomerated material in the vats section of means 55, now minus the aluminum, iron, titanium, etc. mineral values is circulated with fresh water and then neutralized with lime if the subsequent stage of precious metals extraction in the precious metals production means 90 uses a sodium cyanide with air injection leaching process. Other acidic processes for precious metal recovery may not require the lime treatment. The cyanide leaching period can vary with the agglomerated material treated and is expected to require between four and twenty-four hours. This precious metals leach mother liquor, including air injection into the mother liquor, can be recycled in more than one stage, and finally neutralizing liquor is circulated through the vats section of means 55 before the final spent damp agglomerated material is removed, e.g. bucket wheels or other specially designed equipment, from the vats for transportation to backfill the mine, or stockpiled until the base of the ore body has been reached by mining. The precious metals leach mother liquor is then treated conventionally in the precious metal production means 90 to produce precious metals products such as gold and/or silver as is commercially practiced using technologies such as, but not limited to, zinc or carbon.

SUMMARY OF EXPERIMENTAL RESULTS

The following Table 1 tabulates the process results obtained by this invention when typical twelve weight percent bitumen oil sands from Athabasca, Canada, were processed:

TABLE 1

| Material | Head Sample | Spent Sample |
|---|---|---|
| Coarse Sands Tailings | | |
| Alumina | 0.13 | 0.02 |
| Fe | 1.26 | 0.19 |
| Ti | 0.13 | 0.02 |
| Au | 0.006 | None Detected |
| Ag | 0.020 | None Detected |
| Fines Tailings | | |
| Alumina | 10.6 | 1.0 |
| Fe | 2.00 | 0.45 |
| Ti | 0.46 | 0.26 |
| Au | 0.070 | 0.004 |
| Ag | 2.10 | 0.15 |
| Mineral Ores | | |
| Alumina | 9.0 | 1.35 |
| Fe | 2.30 | 0.72 |
| Ti | 0.46 | 0.24 |
| Au | 0.055 | 0.005 |
| Ag | 0.20 | None Detected |

NOTE: Alumina, Fe and Ti values shown are in wt. % and Au and Ag shown are in oz/ton.

This table further substantiates this invention's credibility and the ability to perform the tasks mentioned and is supported by extensive laboratory experiments conducted at the Solv-Ex Research Center and Pilot Plant in Albuquerque, N.M.

Although the present invention has been described in terms of the presently preferred embodiment as illustrated in the drawing figure, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method for extracting valuable minerals and/or precipus metals from oil sands ore bodies or only the valuable minerals and/or precious metals from other related ore bodies containing little or no hydrocarbons, but similar to oil sands ore bodies when the overburden material and/or the interburden material containing clay/fines lenses have common geological mineralization of aluminum values with iron, titanium and possible precious metals, comprising the steps of:

a. developing a mine plan for selective mining of said oil sands ore bodies or said other related ore bodies to improve the precision of ore acquisition;

b. procuring by said selective mining oil sands ore with a cut-off grade greater than two to six weight percent of hydrocarbons hereinafter called oil sands ore, procuring overburden material and interburden clay/fines lenses containing less than two to six weight percent hydrocarbons or no hydrocarbons hereinafter called mineral ores, and procuring other ores related geologically to said oil sands ores, but containing little or no hydrocarbons hereinafter called other related ores;

c. crushing said oil sands ore containing said valuable minerals and/or precious metals after removing oversize material, rock and waste, hereinafter called rejects, to yield a coarse sands stream of particles of a maximum size required for processing;

d. crushing and grinding said other related ores and/or said mineral ores hereinafter called ground mineral ores containing valuable minerals and precious metals after removing the rejects to yield a stream of particles of a maximum size required for processing;

e. alternatively, combining said crushing step with said crushing and grinding step for ores having suitable geological mineralization;

f. extracting the hydrocarbons, if said oil sands ore contains greater than two to six weight percent hydrocarbons in a hydrocarbon extraction means, to produce a coarse sands fraction and a fines fraction both containing valuable minerals and precious metals;

g. transferring said ground mineral ores to either a fines drying means or to the agglomerating section of the agglomerating, curing and leaching means;

h. transferring said coarse sands fraction, if any, to a precious metals flotation means to float said precious metals layer and any hydrocarbons layers removing said layers as a precious metals and water stream and a hydrocarbons and water stream;

i. transferring said coarse sands fraction less said precious metals and said hydrocarbons to a heavy metals removal means for removal of heavy metals where said coarse sands stream and said heavy metals is dewatered and stockpiled or returned to the mine as damp clean coarse sands for backfill;

j. drying said fines fraction and drying said ground mineral ores stream from said crushing and grinding means, if said ground mineral ores stream requires drying, and transferring said fines fractions, and the ground mineral ores stream to said agglomerating, curing and leaching means;

k. mixing said fines, if any, and said ground mineral ores with said heavy metals stream, if any in said agglomerating, curing and leaching means;

l. agglomerating all of said fines, said ground mineral ores and said heavy metal streams with concentrated sulphuric acid to form an agglomerated material, curing the agglomerated material with steam, air drying if required and leaching said agglomerated material;

m. recycling water as a leaching agent between the leaching section of said agglomerating, curing and leaching means and the sulphuric acid leach liquor crystal production and removal means such that said circulated water becomes the sulphuric acid leach mother liquor containing the valuable minerals;

n. processing said sulphuric acid leach mother liquor in a sulphuric acid leach liquor crystal production and removal means to produce aluminum sulphate crystals, ferric/ferrous sulphate crystals and titanyl sulphate crystals, if needed, while recycling the raffinate;

o. converting said aluminum sulphate crystals to cell grade alumina product in the alumina production means;

p. converting said ferric/ferrous sulphate crystals to ferric oxide crystals;

g. converting said ferric oxide crystals to iron products in the form of powder, pellets or plates;

r. converting said titanyl sulphate crystals to titanium dioxide pigment or titanium sponge metal;

s. washing said agglomerated material with water after valuable minerals extraction and neutralizing with lime;

t. leaching with sodium cyanide and water with air injection into the leach liquor to remove said previous metals from the neutralized substantially mineral free said agglomerated material to produce the precious metals leach mother liquor, said precious metals leach mother liquor is then transferred to a precious metals production means, said precious metals leach mother liquor is treated to produce precious metals such as gold and/or silver while recycling the raffinate liquor;

u. circulating neutralizing liquor before the remaining spent neutralized said agglomerated material is removed for transportation to backfill storage or the mine; and v. using the heat and sulphur containing gases generated in said valuable metals production means in the $SO_2$ recovery and $H_2SO_4$ production means to recycle the sulphuric compounds in the process and furnish heat to the cogeneration means for process steam and electricity production.

2. The method of claim 1 wherein, said crushing step further comprises crushing oil sands ore to −6 inch size when the oil sands ore contains greater than 2 to 6 weight percent hydrocarbons and transferring said crushed oil sands ore to the hydrocarbon extraction means.

3. The method of claim 1 wherein, said crushing and grinding means further comprises:

a. crushing and grinding said other related ores including said mineral ores to the maximum particle size of said ground mineral ores which will allow satisfactory agglomeration;

b. transferring said ground mineral ores to the fines drying means or directly to said agglomerating, curing and leaching means, depending on the characteristics and mineralogical matrix of said ground mineral ores.

4. The method of claim 1 wherein, the hydrocarbon extraction means produces a basically hydrocarbons free tailings residue stream as a slurry.

5. The method of claim 4 wherein, said slurry further comprises:

a. a single tailings stream which may be separated into a coarse sands tailings stream slurry of greater than approximately 325 mesh coarse sands and into a fines stream of less than 325 mesh.

6. The method of claim 5 wherein, said fines stream is:

a. dried in a fines drying means;

b. hydrocarbons and water are removed and recycled to said hydrocarbon extraction means for recovery; and c. the dried fines are transferred to the agglomerating, curing and leaching means.

7. The method of claim 1 wherein, said fines may be delivered to either said fines drying means or to said agglomerating, curing and leaching means, depending on the characteristics and mineralogical matrix of said ground mineral ores.

8. The method of claim 1 wherein, said coarse sands fraction from said hydrocarbon extraction means is transferred to a precious metal flotation means.

9. The method of claim 8 further comprising:

a. receiving said coarse sand slurry at said precious metal floation means;

b. passing said coarse sands slurry through precious metals flotation equipment using reagents to float said precious metals and any remaining hydrocarbons into separate layers;

c. removing said hydrocarbons layer as a hydrocarbons and water stream which is recycled to said hydrocarbons extraction means for recovery;

d. removing said precious metals layer as a precious metals stream for transferring said precious metals stream to a precious metals production means; and e. transferring said coarse sands slurry, less said hydrocarbons and said precious metals, to the heavy metals removal means.

10. The method of claim 1, and further including the steps of:

a. receiving said coarse sands slurry less any said hydrocarbons and any said precious metals within said heavy metals removal means;

b. passing said coarse sands slurry through one or more stages of heavy metals separation equipment;

c. transferring the removed said heavy metals stream to the agglomerating, curing and leaching means; and d. dewatering and transferring the spent said coarse sands stream less said heavy metals to be stockpiled or returned directly to the mine for backfill.

11. The method of claim 10 wherein, a portion of said dewatered coarse sands stream is classified for concrete aggregate or dried for glass sand production.

12. The method of claim 1 wherein, the agglomerating, curing and leaching means further comprises:

a. agglomerating all of said fines from said fines drying means or said ground mineral ores from said fines drying means or said crushing and grinding means and said heavy metals removal means and all suitable coal ash from all coal burning processes with concentrated sulphuric acid in agglomerating equipment either to produce an agglomerated material for high yield leaching;

b. curing the agglomerated material in vats with steam to cause an exothermic reaction and drying the cured agglomerated material with air while recovering the reaction gases for recycle to sulphuric acid production;

c. leaching said cured agglomerated material for valuable minerals, and then d. cyanide leaching said cured agglomerated material for precious metals values after the valuable minerals have been extracted.

13. The method of claim 12 wherein, within the agglomerating section of the agglomerating, curing and leaching means further comprises:

a. adding concentrated sulphuric acid to gain a liquid weight approximately equivalent to 50 weight percent of the solid weight of the fines and the excess sulphuric acid is in the order of 5 to 40 weight percent of the stoichiometric amount needed to convert the minerals to sulphates; and b. transferring said agglomerated material to vats for curing and leaching.

14. The method of claim 13 wherein, the curing step further comprises:

a. raising the temperature of said agglomerated material in the vats to about 70°–100° C. using steam resulting in an exothermic reaction and raising the temperature up to around 170°–200° C. with the evolution of reaction gases;

b. hot air drying, if required by the characteristics and mineralogical matrix of said agglomerated material; and c. recovering and recycling the $SO_2$ gases.

15. The method of claim 13 wherein, the leaching of said agglomerated material to produce the sulphuric acid leach liquor containing the valuable minerals is followed by at least one washing step and the resultant wash liquor is combined with the sulphuric acid leach mother liquor for maximum valuable minerals content.

16. The method of claim 13 wherein, said cyanide leaching period varies between 4 and 24 hours depending on the agglomerated materials treated.

17. The method of claim 1 wherein, the processing of said sulphuric acid leach mother liquor to produce aluminum sulphate crystals, ferric/ferrous sulphate crystals and titanyl sulphate crystals while recycling the raffinate liquor further comprises:

a. concentrating said sulphuric acid leach liquor at a temperature of approximately 20° C. by evaporation if the ferric/ferrous concentration is above 1% in said sulphuric acid leach liquor;

b. continuously precipitating said ferric/ferrous sulphate crystals;

c. centrifuging with an option for washing the ferric/ferrous sulphate crystals;

d. concentrating said sulphuric acid leach liquor at as temperature of approximately 20° C. by evaporation when the ferric/ferrous concentration is greater than approximately 1% of said sulphuric acid leach liquor;

e. continuously precipitating said aluminum sulphate crystals;

f. centrifuging and washing said aluminum sulphate crystals with cold water equivalent to approximately 30 weight percent of the crystals to insure that the crystals are of the purity required for cell grade alumina production;

g. after the initial aluminum sulphate removal step, the remaining said sulphuric acid leach is further contacted by water evaporation and cooled to about 20° C. for continuous removal of the iron in the form of ferric sulphate crystals with some ferrous sulphate present using crystallizers;

h. centrifuging and washing said iron sulphate crystals whereby the iron sulphate crystal production is completed;

i. concentrating and heating to approximately 80° C. the remaining sulphuric acid leach liquor and removing aluminum sulphate in the form of additional aluminum sulphate crystals using crystallizers and centrifuges;

j. adding said additional aluminum sulphate crystals to the initial aluminum sulphate crystals;

k. recycling said remaining sulphuric acid leach liquor until the processing produces a recycle leach liquor of about equal proportions of iron sulphate and titanium dioxide;

l. taking off a bleed stream from said recycle leach liquor at the rate at which titanium is introduced into the leach liquor in the leaching section of the agglomerating, curing and leaching means; and m. precipitating the titanyl sulphate crystals by hydrolysis using steam and seeding rutile or anatase.

18. The method of claim 1 wherein, the alumina production means further comprises:

a. means for recrystallizing and washing said alumina sulphate crystals from said sulphuric acid leach liquor production and crystal removal step to eliminate any iron impurity or other impurities that exceed the specifications for cell grade alumina; and b. means for drying and calcinating said pure crystals of aluminum sulphate in heated fluid beds for the production of cell grade alumina product.

19. The method of claim 1 wherein, the step of converting said ferric oxide crystals to the iron products comprises:
 a. centrifuging and washing said ferric oxide crystals;
 b. drying and calcining said ferric oxide crystals using conventional fluid bed equipment to produce ferric oxide powder;
 c. reducing the ferric oxide crystals using fluid bed equipment or other means to produce iron powder, pellets or plates.

20. The method of claim 1 wherein, the step of converting said titanyl sulphate crystals to titanium dioxide pigment or titanium sponge metal further comprises:
 a. calcining said titanyl sulphate crystals and converting said titanyl sulphate crystals to titanium dioxide pigment product;
 b. grinding the calcined titanium dioxide crystals into a fine $-325$ mesh powder and mixing it with powdered carbon in a stoichiometric quantity capable of producing CO to $CO_2$ in a ratio of approximately 2 to 1 and then chlorinating it in a pipe reactor less than 2 minutes while the reaction of the ground crystals with said powdered carbon with a stoichiometric quantity of chlorine at temperatures in the range of 900° to 1000° C. to produce titanium tetrachloride vapors;
 c. cooling said titanium tetrachloride vapors in a fractionation column with a minor iron chloride waste stream, and with the high boiling point impurities being removed from the bottom of the fractionation column and the low boiling point impurities being removed from the top of the column;
 d. fractionally distilling said titanium tetrachloride vapors to produce titanium tetrachloride and then putting it into electrolytic cells to produce titanium sponge metal while recycling and oxidizing the chlorine and the titanium tetrachloride to produce titanium dioxide with the chlorine recycled.

21. The method of claim 1 wherein, all sulphur containing gases produced in all means of the method are treated in the $SO_2$ recovery and $H_2SO_4$ production means for recycle within the method.

22. The method of claim 1 wherein, all heat recovered from all means of the method is used in the process steam and process electricity cogeneration means to produce the process steam and process electricity requirements.

23. A method for extracting valuable minerals and/or precious metals from ore bodies containing valuable minerals and/or precious metals, comprising the steps of:
 a. procuring oil sands ore with a cut-off grade greater than two to six weight percent of hydrocarbons, or other related ores of similar geologically and mineralogical characterization to said sands ore but containing little or no hydrocarbons, or mineral ores from overburden material and interburden clay/fines lenses containing less than two weight percent hydrocarbons;
 b. removing reject material of rock and wastes from said oil sands ore;
 c. crushing said oil sands ore containing said valuable minerals and/or precious metals to yield a coarse sand stream of particles of the maximum size required for processing;
 d. removing rejects from said other related ores;
 e. crushing and grinding said other related ores and said mineral ores to provide ground mineral ores containing valuable minerals and precious metals, hereinafter called ground mineral ores, to yield a stream of ground mineral ores of maximum size required for processing;
 f. extracting the hydrocarbons from said oil sands ore containing greater than two to six weight percent hydrocarbons in a hydrocarbon extraction means to produce a coarse sands fraction and a fines fraction containing valuable minerals and/or precious metals;
 g. transferring said coarse sands fraction to a precious metals floatation means to float layers of said precious metals and any hydrocarbons layers to remove said layers as separate streams for precious metals and hydrocarbons resulting in a first by-product of said coarse sands fraction less said precious metals and said hydrocarbons;
 h. transferring said first by-product to a heavy metals removal means for removal of heavy metals to provide a second by-product of said first by-product less said heavy metals;
 i. dewatering the said second by-products to provide dewatered second by-product;
 j. drying said fines fraction from hydrocarbon extraction means;
 k. mixing said fines, said ground mineral ores and said heavy minerals streams in said agglomerating, curing and leaching means to establish a first mixture;
 l. agglomerating said first mixture with concentrated sulphuric acid, then curing the agglomerated material with steam followed by air drying and then leaching said agglomerated material;
 m. recycling water between the leaching section of said agglomerating, during and leaching means and the sulphuric acid leach liquor crystal production and removal means whereby said water becomes the sulphuric acid leach motor liquor containing the valuable minerals;
 n. processing said sulphuric acid leach mother liquor containing valuable minerals in a sulphuric acid leach liquor crystal production and removal means to produce aluminum sulphate crystals, ferric/ferrous sulphate crystals and/or titanyl sulphate crystals, while recycling the raffinate liquor;
 o. converting said aluminum sulphate crystals to cell grade alumina product;
 p. converting said ferric/ferrous sulphate crystals to ferric oxide crystals;
 q. converting said ferric oxide crystals to iron powder, iron pellets or iron plates;
 r. converting said titanyl sulphate crystals to titanium dioxide pigment or titanium sponge metal;
 s. washing said agglomerated material with water after valuable minerals extraction and neutralizing with lime if the subsequent step of precious metals production utilizes sodium cyanide leaching;
 t. leaching said agglomerated material with sodium cyanide and water with air injection into the leach liquor to remove said previous metals from said neutralized agglomerated material to produce precious metals leach mother liquor; and u. producing precious metals from said precious metals leach mother liquor.

24. The method of claim 23 including the step of:
conveying said dewatered second by-product to a stockpile or directly to a mine for backfill.

25. The method of claim 23 including the step of:
transferring said ground mineral ores to either the fines drying means, if needed, or otherwise directly to the agglomerating section of the agglomerating, curing and leaching means.

26. The method of claim 23 including the alternative step of:
using an aluminum chloride method to produce aluminum metal by electrolytic cells while recycling the chlorine.

27. The method of claim 23 including the step of:
recycling heat and sulphur containing gases to recover $SO_2$ to generate $H_2SO_2$, heat and electricity.

* * * * *